Figure 1:
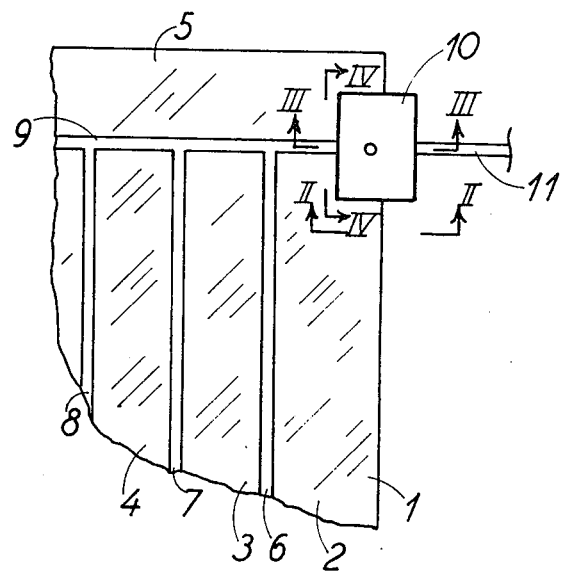

United States Patent [19]

Bruel et al.

[11] 4,047,516
[45] Sept. 13, 1977

[54] PIPE JOINT FOR RADIATOR ELEMENT OF THIN MATERIAL

[76] Inventors: Per Wilhelm Bruel, Fuglevagsveig 5, DK-2960 Rungsted; Holger Schioler, Rode Hus, Hojbjergvej 17, DK-4171 Jystrup; Johannes Tejlgaard Jensen, Norasvej 11, D K-2920 Charlottenlund, all of Denmark

[21] Appl. No.: 644,906

[22] Filed: Dec. 29, 1975

[30] Foreign Application Priority Data

Jan. 17, 1975 Denmark .............................. 113/75

[51] Int. Cl.² .............................................. F24J 3/02
[52] U.S. Cl. .................................... 126/270; 285/158; 285/176; 285/175; 285/294
[58] Field of Search ............... 285/158, 189, 176, 175, 285/294, 297, 373, 172, 197; 126/220, 271

[56] References Cited

FOREIGN PATENT DOCUMENTS 2,065,045 4/1972 Germany .............................. 285/294
28,632AD 1903 United Kingdom .................. 285/175

Primary Examiner—Dave W. Arola
Attorney, Agent, or Firm—Burgess, Ryan and Wayne

[57] ABSTRACT

A pipe joint for joining a relatively thick walled externally threaded pipe to a relatively thin walled tubing of a flat solar absorbing panel is both slotted to receive part of the flat solar panel and bored to receive the thin walled solar tubing. The block is further provided with an internal thread communicating with the aperture into which the tubing is inserted.

5 Claims, 7 Drawing Figures

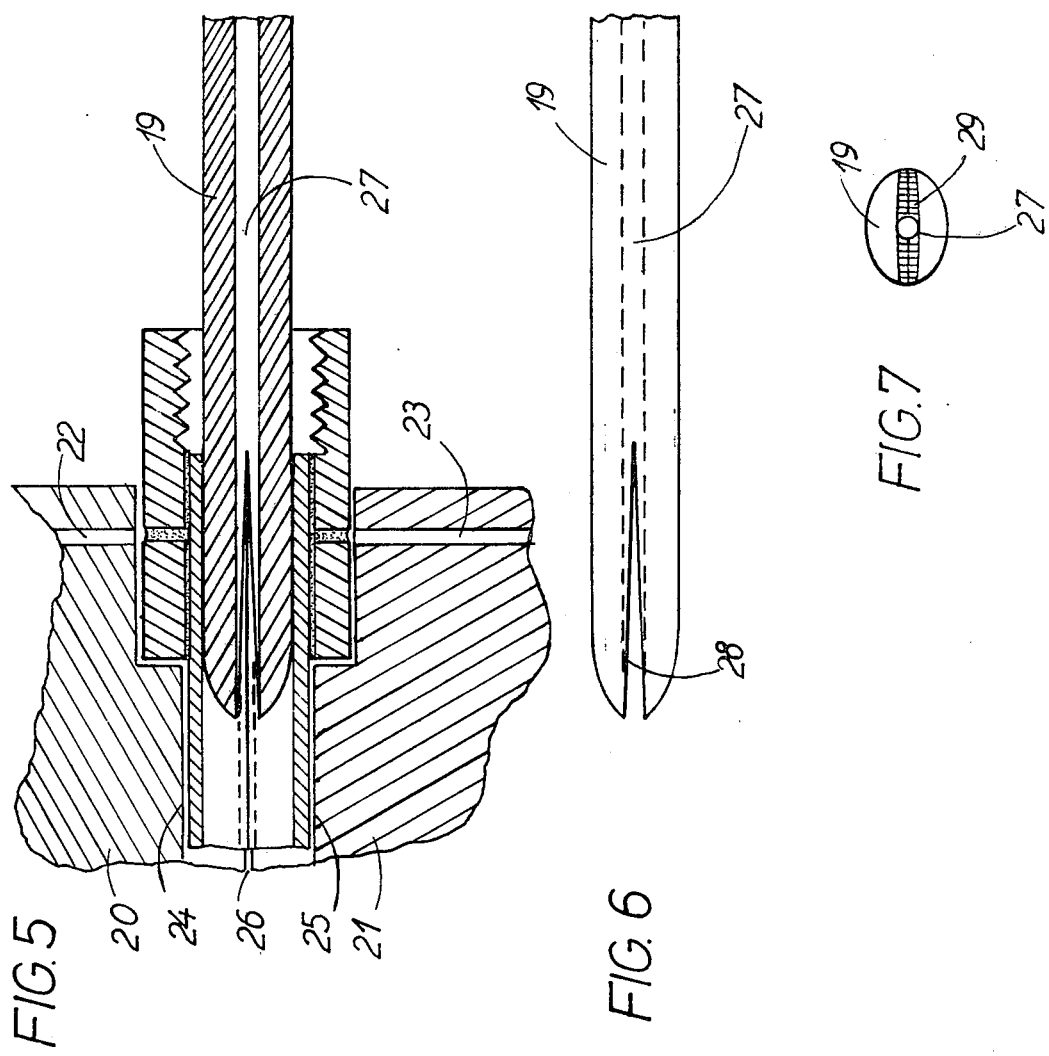

PIPE JOINT FOR RADIATOR ELEMENT OF THIN MATERIAL

The invention relates to a pipe joint for a slender radiator element or a radiator element workpiece of a foil-like thin material preferably for absorption of solar energy, and in which a thickened section in form of a discharge or inlet channel is passing mainly at a right angle out to on edge of the element. By the construction of radiator elements to be applied in the absorption of solar energy it is important for several reasons to use a very thin material e.g. metal foil. Connection to conventional pipe systems in which are used for instance threaded joints offers accordingly problems primarily with regard to the achievement of the required tightness and mechanical coupling.

The object of the invention is therefore to devise a collecting unit fitted for fastening to radiator elements of the mentioned description and in which it is possible to establish connections in the already generally known manner.

The pipe joint according to the invention is characterized in a slotted block consisting of plastically deformable material for instance metal, or consisting of a elastic material, which at the inlet or discharge point is passing in over the edge of the element, and which flush with the slot and at right angle to bottom of it is designed to have a channel, the cross section of which is mainly corresponding to the external cross section of the inlet or discharge channel, and further in that the edge of the element is passing into the bottom of the slot, and in that another channel is made in the block leading in to the place in the block where the first channel is ending. It is hereby possible to fasten the collecting unit to the radiator element over a relatively great area i.e. the area of the slot on both sides of the radiator element in such a way that the required force can be transferred without the risk of fractures. This may be done by means of such tensions in the block which will endeavour to squeeze the block firmly around the radiator element. Such tensions may be produced when the block is elastic and exposed to an initial tension, or if the block is plastically deformable and subjected to a deformation by the mounting. In order to strengthen and tighten the joint there can according to the invention be cement or sealing compound between the cleavage faces and the radiator element. It should be pointed out that by using a suitable adhesive substance it is possible entirely to avoid deformation or elastic initial tension of the block. The outer end of the other channel in the block can according to the invention be designed with an internal thread. This will render it possible, in case the block is made of metal, to have a soldered junction or a similar joint in this place.

The pipe joint may further be characterized in that in the block is made one or several channels leading to the inner faces of the slot and which are mainly filled with cement or sealing compound. It is thus possible in a practical way to lead cement or sealing compound through the said channels and simultaneously secure that the cement or sealing compound will be conveyed to the correct places and be well distributed.

The invention relates furthermore to a method for the making of the pipe joint concerned, the said method being characterized in that a punch, preferably tapered in one end, is inserted into inlet or discharge channel of the radiator element through the channel leading through the unslotted section of the block, before or after the block is passed in over the element and fastened. By inserting the punch into the inlet or discharge channel before the block is fastened to the radiator element the latter will be safe from damage, when the block is deformed. The punch will simultaneously warrant that the channel is not filled with cement or sealing compound, if this is pressed in.

The method may further be characterized in that cement or sealing compound is pressed in between the contact faces. In case the block is subjected to a plastic deformation the pressing-in of cement or sealing compound must take place first. There is, however, no reasons why the fastening should be accomplished solely by means of the adhesive substance.

The invention relates eventually to a tool to be used for the making of the pipe joint or for the performance of the method, which tool is characterized by having in relation to each other movable pressing dies as well as one or several punches for insertion into inlet or discharge channels of a radiator element or a radiator element workpiece. By using such a tool of which usually one of the pressing dies is stationary and acting as a support it may according to the invention be preferential to have the pressing faces designed with nozzles for cement or sealing compound, which are adjustable to the channels for cement or sealing compound in the block. It is thus possible in one procedure to press in cement or sealing compound and to squeeze the block.

The tool may further be characterized by having at least one of the punches hollow, and in that the pressing dies are provided with pressing faces acting as molding faces for the radiator element, and that the tool has opportunities for insertion of a pressure medium through the hollow punch into the workpiece. This allows not only the fastening of the block to the radiator element in one procedure but also the completion of the radiator element if still unfinished. Radiator elements of the said description may be produced by cementing or welding two metalfoils together over certain areas in a defined pattern. Between these areas the foils are not attached, as the intervals are constituting a channel pattern, of which the channels after the joining of the foils are pressed into the desired shape by means of a pressure fluid pressed into the channels. Each radiator element will ordinarily have one inlet and one discharge and accordingly by the fastening of the two collecting units to the radiator element already two punches are leading into the channel system, it will be advantageous as stated to press a medium in through one of the punches simultaneously with the pressing in between one set of molding faces for the shaping of the entire radiator element. The tool may furthermore be characterized in that each of the punches is provided with at least one longitudinal slot in the outer end. By way of such a slot it is possible to render to the punch a deformability, which will facilitate the withdrawal after the deformation of the block. The sot may advantageously be filled with an elastic yielding material for instance vulcanized rubber.

Figure 2:
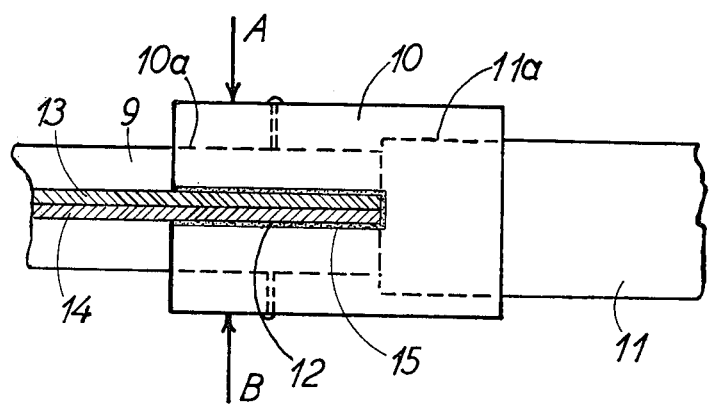
Figure 3:
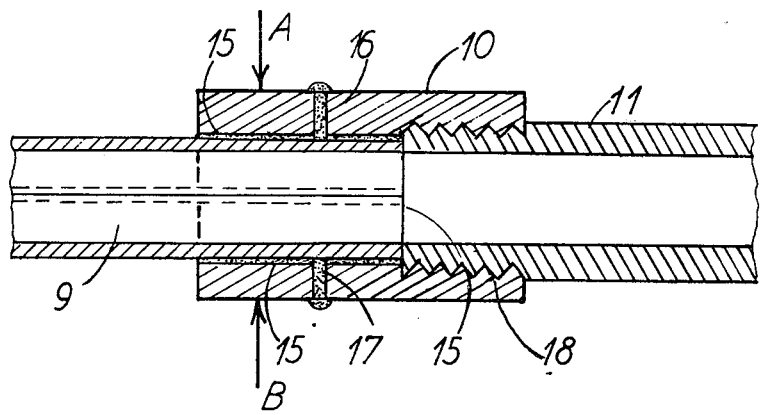
Figure 4:
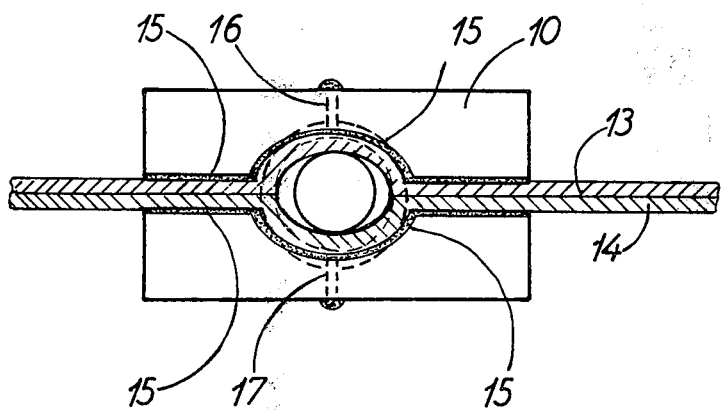

The invention will be described in detail below with reference to the drawing in which FIG. 1 shows a section of a radiator element in a front view with a pipe joint according to the invention, FIG. 2 shows an enlarged section following the line II — II of FIG. 1, FIG. 3 shows an enlarged section following the line III — III of FIG. 1, FIG. 4 shows an enlarged section following the line IV — IV of FIG. 1, FIG. 5 shows a section corresponding to FIG. 3, but depicting a stage in the production of a pipe joint according to the invention, in which a punch has been inserted into the inlet or the discharge channel, and with the pipe joint embraced by pressing dies, FIG. 6 shows the outer end of a punch with a slot viewed from one side, and FIG. 7 shows a punch with filling of vulcanized rubber in the slot, viewed from one end.

FIG. 1 shows a section of a radiator element 1 preferably intended for absorption of solar heat and consisting of two metal foils cemented together over certain defined areas 2, 3, 4, 5 and between which are extruded channels 6, 7, 8 and 9, of which the channel 9 is an inlet or discharge channel, leading to one edge of the radiator element, to which is fastened a collecting unit in form of a block 10, as a channel 10s, of cf. FIG. 2, in the block 10 encloses the channel 9. In the said collecting unit 10 is fastened an inlet or discharge pipe 11 in a channel 11a, cf. FIG. 2. The pipe 11 together with the collecting unit 10 and its connection to the radiator element are jointly constituting the pipe joint according to the invention.

FIG. 2 shows the said pipe joint viewed from below in FIG. 1 following the section line II — II. In FIG. 2 the block 10 is seen to enclose a section of the edge of the radiator element, as the block is designed with a slot 12, squeezed together round the radiator element 1, which is made up of two metal foils 13 and 14 cemented together, in which is pressed out an inlet or discharge channel 9 ending inside the block 10, but continuing in the pipe 11. This is more explicitly described in FIG. 3 showing a section through the block 10 following the line III — III. The radiator element 1 is firmly cemented to the block 10 by means of an adhesive substance 15, pressed in through the channels 16 and 17 on either side of the block 10. The pipe 11 is fixed to the block 10 by way of a thread 18. FIG. 4 shows the block 10 viewed from one side following the section IV — IV of FIG. 1. The reference numbers are identical with those of the other figures.

In the preferred embodiment the block will probably be made of a plastically deformable material e.g. metal, and effect a squeeze on the block 10 at the arrows A and B, when adhesive substance has been supplied or pressed in. In the said case it will be advantageous as shown in FIG. 5 to insert a guiding punch 19 into the inlet or discharge channel 9. This will make it possible to avoid damage to the pipe joint when the pressing dies 20 and 21 are embracing the block 10. The pressing dies 20 and 21 may be provided with inlet channels or nozzles 22 and 23 for adhesive substance, adjustable to the respective channels 16 and 17 for the supply of adhesive substance. The pressing dies 20 and 21 may moreover be designed to have pressing faces or molding faces 24, 25 and 26 for the shaping of the very radiator element 1. This can be achieved if one of the punches 19 leading into a radiator element by the fastening of the collecting unit to the latter is provided with an axially passing channel 27 for introduction of a pressure medium. The punch 19 can be slotted in one end to facilitate withdrawal after the deformation of the block. In the said slot there may be a filling 29 as shown in FIG. 7, which likewise shows an embodiment of a slot 28, with the punch viewed from one end. The filling 29 may consist of vulcanized rubber. In this manner a suitable elasticity of the punch is achieved.

The procedure for production of a pipe joint according to the invention could thus be as follows:

A radiator element or a radiator element workpiece 1 is placed in a position between the pressing dies 20 and 21 and held firmly. The punch 19 is inserted into the channel 9, and the block 10 enclosing the punch 19 is pushed in over the radiator element 10 until positioned with the nozzles 22 and 23 off the channels 16 and 17. The pressing dies 20 and 21 are brought so close that the nozzles 22 and 23 will secure the block 10 against sideward shifts. The punch 19 is inserted further into the radiator element or the workpiece at least so far that the tapered end of the punch 19 is passing right through the block 10. The pressing dies 20 and 21 are now joined so closely that they produce a tightening at the nozzles 22 and 23, and the block 10, after which the adhesive substance is pressed in through the nozzles 22 and 23. The pressing dies 20 and 21 are further tightened, so that the block 10 is deformed permanently around the radiator element 1 and the punch 19. In the said position it is possible to introduce a pressure medium through the channel 27 with the purpose of accomplishing an ultimate shaping of all the channels 6, 7, 8, 9 and others in the radiator element.

We claim:

1. A pipe joint for a radiator element, wherein the radiator element is a sheet of radiation absorbing material having a conduit passing therethrough in directions defined by the major surfaces of said sheet of radiation absorbing material, said conduit having a diameter essentially greater than the thickness of said sheet of radiation absorbing material and terminating at substantially right angles to an edge of said radiation absorbing material, said pipe joint comprising a block of deformable material adopted to be attached to said radiator element, said block being provided with a slot having a thickness substantially equal to the thickness of said sheet of radiation absorbing material, the bottom of said slot substantially conforming to said edge of said sheet of radiation absorbing material, said block being further provided with a first channel through said slot at substantially right angles to the bottom of said slot and having a cross-section substantially corresponding to the external dimensions of said conduit at the edge of said sheet of radiation absorbing material, said first channel passing through the bottom of said slot and terminating within the block beyond said slot, and said block being provided with a further channel through an edge of said block and communicating with said terminal end of said first channel, the surface area of the internal portions of said slot and said first channel being substantially greater than the internal surface area of said first channel.

2. A pipe joint according to claim 1, further comprising an adhesive substance between the internal faces of said slot and the radiator element when said block is positioned on said radiator element such that said conduit and first channel are aligned.

3. A pipe joint as recited in claim 1, wherein said block of material comprises a metal and further comprising a means for biasing the internal faces of said slot toward each other.

4. A pipe joint as recited in claim 1, wherein said further channel is provided with an internal thread.

5. A pipe joint as recited in claim 1, further comprising a plurality of additional channels communicating with the internal surfaces of said slot and being filled with an adhesive compound when said block is positioned said radiator element such that said conduit and first channel are aligned.

* * * * *